United States Patent
Lee et al.

(10) Patent No.: US 8,509,152 B2
(45) Date of Patent: Aug. 13, 2013

(54) METHOD AND APPARATUS FOR ROUTING IN WIRELESS NETWORK

(75) Inventors: Nam Kyung Lee, Daejeon (KR); Dae Ig Chang, Daejeon (KR); Ho Jin Lee, Daejeon (KR); Dong Jun Lee, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 443 days.

(21) Appl. No.: 12/996,925

(22) PCT Filed: Nov. 5, 2008

(86) PCT No.: PCT/KR2008/006506
§ 371 (c)(1),
(2), (4) Date: Dec. 8, 2010

(87) PCT Pub. No.: WO2009/151187
PCT Pub. Date: Dec. 17, 2009

(65) Prior Publication Data
US 2011/0164565 A1 Jul. 7, 2011

(30) Foreign Application Priority Data
Jun. 9, 2008 (KR) .................. 10-2008-0053863

(51) Int. Cl.
*H04W 4/00* (2009.01)

(52) U.S. Cl.
USPC ...... 370/328; 370/315; 370/354; 370/395.21; 370/395.31

(58) Field of Classification Search
None
See application file for complete search history.

(56) References Cited

U.S. PATENT DOCUMENTS

| | | | | |
|---|---|---|---|---|
| 5,668,951 A * | 9/1997 | Jain et al. | ...... | 709/235 |
| 6,128,644 A * | 10/2000 | Nozaki | ...... | 709/203 |
| 7,035,207 B2 * | 4/2006 | Winter et al. | ...... | 370/225 |
| 7,280,483 B2 * | 10/2007 | Joshi | ...... | 370/238 |

(Continued)

FOREIGN PATENT DOCUMENTS
KR 10-2005-0060315 6/2005

OTHER PUBLICATIONS

Ching-Yu Lin et al., "Load-Balanced Anycast Routing," Tenth International Conference on Parallel and Distributed Systems, IEEE, 2009, 8pp.

(Continued)

*Primary Examiner* — Warner Wong
*Assistant Examiner* — Dung B Huynh
(74) *Attorney, Agent, or Firm* — Staas & Halsey LLP

(57) ABSTRACT

A method of routing a wireless network is provided. The method is performed by each of a group of nodes and includes: receiving a routing request signal; determining whether a node itself is a destination node, by referring to a traffic distribution table showing traffic throughput of the group of nodes and an intermediate-node weight table showing weights of intermediate nodes on all paths between the group of nodes and a source node, wherein a route path is selected by referring to the weights of intermediate nodes; and when it is determined that the node itself is the destination node transmitting a routing response signal to the source node that has transmitted the routing request signal, and receiving a packet from the source node, wherein the transmitting and receiving are performed by the determined destination node. By using the method, traffic in wireless network extreme communications can be distributed at intermediate nodes as well as at destination nodes. Therefore, all the networks can be effectively used in extreme circumstances.

9 Claims, 4 Drawing Sheets

(56) References Cited

U.S. PATENT DOCUMENTS

| | | | |
|---|---|---|---|
| 7,558,209 B2* | 7/2009 | Kodialam et al. | 370/238 |
| 7,808,960 B1* | 10/2010 | Chan et al. | 370/338 |
| 7,899,027 B2* | 3/2011 | Castagnoli et al. | 370/350 |
| 2003/0054796 A1* | 3/2003 | Tamaki et al. | 455/406 |
| 2003/0174691 A1* | 9/2003 | Muhonen et al. | 370/351 |
| 2005/0073992 A1* | 4/2005 | Lee et al. | 370/351 |
| 2006/0015875 A1* | 1/2006 | Ishihara et al. | 718/102 |
| 2006/0120340 A1* | 6/2006 | Mizukoshi | 370/338 |
| 2006/0171346 A1* | 8/2006 | Kolavennu et al. | 370/328 |
| 2006/0268727 A1* | 11/2006 | Rangarajan et al. | 370/248 |
| 2006/0293061 A1* | 12/2006 | Kobayashi et al. | 455/455 |
| 2007/0025353 A1* | 2/2007 | Nambisan et al. | 370/392 |
| 2007/0070959 A1* | 3/2007 | Almeroth et al. | 370/338 |
| 2007/0091863 A1* | 4/2007 | Sampath et al. | 370/338 |
| 2007/0195702 A1* | 8/2007 | Yuen et al. | 370/238 |
| 2007/0248067 A1* | 10/2007 | Banerjea et al. | 370/338 |
| 2008/0010385 A1* | 1/2008 | Lee et al. | 709/241 |
| 2008/0101332 A1* | 5/2008 | Kim et al. | 370/350 |
| 2008/0117823 A1* | 5/2008 | Krishnakumar et al. | 370/236 |
| 2008/0170550 A1* | 7/2008 | Liu et al. | 370/338 |
| 2009/0064293 A1* | 3/2009 | Li et al. | 726/6 |
| 2009/0135824 A1* | 5/2009 | Liu | 370/392 |
| 2009/0185494 A1* | 7/2009 | Li et al. | 370/241 |

OTHER PUBLICATIONS

Gegang Peng et al., "ARDSR: An Anycast Routing Protocol for Mobile Ad Hoc Network," IEEE Sixth CAS Symp. on Emerging Technologies: Mobile and Wireless Comm., IEEE, 2004, pp. 505-508.

Bing Wu et al., "k-Anycast Routing Schemes for Mobile Ad Hoc Networks," Parallel and Distributed Processing Symposium, 2006, 10pp.

Dong Xuan et al., "A Routing Protocol for Anycast Messages," IEEE Transactions on Parallel and Distributed Systems, vol. 11, No. 6, 2000, pp. 571-588.

International Search Report for PCT/KR2008/006506, mailed on Apr. 15, 2009.

* cited by examiner

METHOD AND APPARATUS FOR ROUTING
IN WIRELESS NETWORK

CROSS-REFERENCE TO RELATED PATENT APPLICATIONS

This application claims the benefit under 35 U.S.C. Section 371, of PCT International Application No. PCT/KR2008/006506, filed on Nov. 5, 2008, which claimed priority to Korean Patent Application No. 10-2008-0053863, filed on Jun. 9, 2008, in the Korean Intellectual Property Office, the disclosures of which is incorporated herein in their entirety by reference.

BACKGROUND OF THE INVENTION

1. Field of the Invention

The present invention relates to a method and apparatus for routing in a wireless network to reduce a traffic jam in a wireless network that occurs due to heavy communications traffic under extreme circumstances.

2. Description of the Related Art

Under extreme circumstances, wireless traffic in a communications network is significantly increased and a single wireless ad-hoc node cannot cope with the increase. However, conventional techniques do not consider a traffic jam at both a destination node and an intermediate node. That is, traffic is distributed only at the destination node. Therefore, a traffic jam cannot be avoided.

SUMMARY OF THE INVENTION

The present invention provides a method and apparatus for routing in a wireless network, in which an anycast operation is added to an ad-hoc routing algorithm to distribute traffic both at a destination node and at an intermediate node so that a traffic jam in extreme circumstances can be alleviated.

According to an aspect of the present invention, there is provided a method of routing in a wireless network, which is performed by each of a group of nodes, the method including: receiving a routing request signal; determining whether a node itself is a destination node, by referring to a traffic distribution table showing traffic throughput of the group of nodes and an intermediate-node weight table showing weights of intermediate nodes on all paths between the group of nodes and a source node, wherein a route path is selected by referring to the weights of intermediate nodes; and when it is determined that the node itself is the destination node transmitting a routing response signal to the source node that has transmitted the routing request signal, and receiving a packet from the source node, wherein the transmitting and receiving are performed by the determined destination node.

According to another aspect of the present invention, there is provided an apparatus for routing in a wireless network, the apparatus comprising each of a group of nodes, the apparatus including: an interface unit receiving a routing request signal and a packet from a source node and transmitting a routing response signal to the source node; a memory storing a traffic distribution table showing traffic throughput of the group of nodes and storing an intermediate-node weight table showing weights of intermediate nodes on all paths between the group of nodes and the source node, wherein a route path is selected by referring to the weights of intermediate nodes; and a routing control unit determining a node as a destination node that is to generate the routing response signal by referring to the traffic distribution table and the intermediate-node weight table, generating the routing response signal, and transmitting the generated routing response signal to the source node.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

An apparatus and method for routing in a wireless network according to the present invention will now be described more fully with reference to the accompanying drawings, in which exemplary embodiments of the invention are shown.

Figure 1:
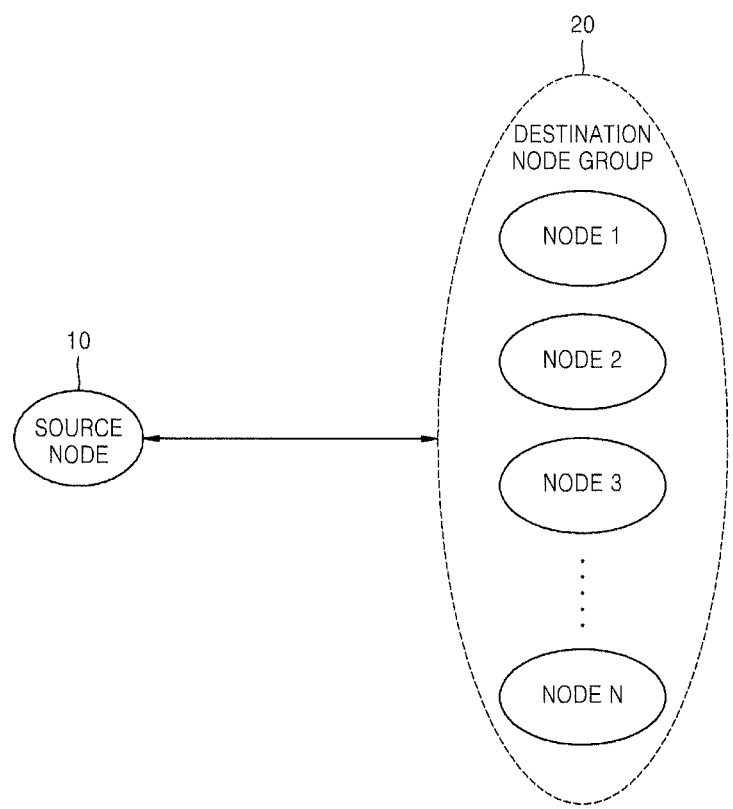
FIG. 1 illustrates a source node and a group of nodes to explain an apparatus for routing in a wireless network according to an embodiment of the present invention.

FIG. 1 illustrates a source node 10 and a group of nodes 20 to explain an apparatus for routing in a wireless network according to an embodiment of the present invention.

Referring to FIG. 1, the source node 10 transmits a routing request (RREQ) signal to the group of nodes 20, with reference to an address mapping table that contains an anycast address and a unicast address.

Table 1 shows an example of an address mapping table that contains an anycast address and a unicast address.

TABLE 1

| Field | Type | Null | Key | Default |
|---|---|---|---|---|
| Unicast Addr. | char 16 | | PRI | |
| Anycast Addr. | char 16 | | MUL | |
| TTL | Int 10 | | | |

In Table 1, Field indicates the column name, Type indicates the column data type, Key indicates whether the column is indexed, and Default indicates the default value that is assigned to the column when no value is input. In the Type field, char denotes a character-type 16 bytes. The Null field is Yes when input of data is optional. If Key is PRI, the column is part of a primary key of the table, and if Key is MUL, multiple occurrences of a given value are allowed within the column.

The source node 10 searches for a unicast address corresponding to an anycast address by referring to the address mapping table. If the address mapping table does not contain the unicast address corresponding to the anycast address, the source node 10 transmits a RREQ signal to the group of nodes 20 corresponding to the anycast address. For example, the source node 10 searches for a unicast address by referring to the address mapping table.

A destination node is selected from the group of nodes 20 by referring to a traffic distribution table showing traffic throughput and an intermediate-node weight table showing weights of intermediate nodes, and transmits a routing response signal generated by the selected destination node to the source node 10. Later, a route path is selected by referring to the weights of intermediate nodes.

Figure 2:
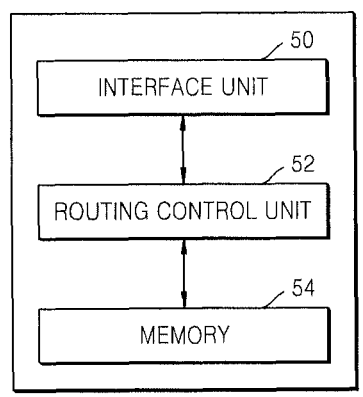
FIG. 2 is a block diagram of each node illustrated in FIG. 1.

FIG. 2 is a block diagram of each node of the group of nodes 20. Referring to FIG. 2, the node includes an interface unit 50, a routing control unit 52, and a memory 54.

The interface unit 50 receives the RREQ signal or a packet from the source node 10. Also, the interface unit 50 transmits the routing response signal to the source node 10.

The memory 54 stores the traffic distribution table showing traffic throughput of the group of nodes and the intermediate-node weight table showing weights of intermediate nodes on all paths between the group of nodes (20 of FIG. 1) and the source node (10 of FIG. 1).

The routing control unit 52 determines that its own node is a destination node that is to generate the routing response signal by referring to the traffic distribution table and intermediate-node weight table stored in the memory 54, generates the routing response signal, and transmits the generated routing response signal to the source node 10. The routing control unit 52 collects the RREQ signal which is transmitted to the group of nodes 20 for a predetermined time period. When the predetermined time period has passed, the routing control unit 52 determines whether its own node is a destination node that has the smallest traffic throughput in the group of nodes 20 by referring to the traffic distribution table. If its own node is the destination node having the smallest traffic throughput, the routing control unit 52 selects a route path by referring to the intermediate-node weight table. The routing control unit 52 of the determined destination node transmits a routing response signal to the source node 10 through the selected route path.

On the other hand, if its own node is not the destination node having the smallest traffic throughput in the group of nodes 20, the routing control unit 52 deletes the RREQ signal transmitted to its own node. In addition, the routing control unit 52 updates the intermediate-node weight table with the selected route path.

Specifically, the traffic distribution table shows current traffic throughputs of nodes. The network load on nodes is evaluated based on the traffic distribution table. Table 2 shows an example of a traffic distribution table.

TABLE 2

| Field | Type | Null | Key | Default |
|---|---|---|---|---|
| IP | char 16 | | PRI | |
| Traffic | Int 10 | | | 0 |
| Update | Timestamp 14 | | | |

If a destination node, such as nodes 1 to N of the group of nodes (20 of FIG. 1), is located at an anycast address that is identical to a target address of the transmitted RREQ, the destination node collects the RREQ signal for a predetermined time period without immediate transmission of a routing response signal. When the predetermined time period has passed, a node that has the smallest traffic throughput in the group of nodes (20 of FIG. 1) consisting of nodes 1 to N is determined as a destination node by referring to the traffic distribution table. When the destination node having the smallest traffic throughput is determined, the other nodes delete RREQ signals they have received.

The destination node having the smallest traffic throughput selects a route path by referring to the intermediate-node weight table, and transmits a routing response signal to the source node 10 through the selected route path. Table 3 shows an example of an intermediate-node weight table.

TABLE 3

| Field | Type | Null | Key | Default |
|---|---|---|---|---|
| IP | char 16 | | PRI | |
| Weight | Int 10 | | | 0 |
| TTL | Int 10 | | | |

The intermediate-node weight table contains a numerical value of the number of routing response signals passing through intermediate nodes on the selected route path and a numerical value of IP addresses of the intermediate nodes. The smaller the numerical value, the smaller the network load on an intermediate node is.

The destination node having the smallest traffic throughput selects a route path that has the smallest sum of intermediate node weights by referring to the intermediate-node weight table. If the sum of intermediate node weights is the same, a path in which the number of intermediate nodes is smallest is selected. If the sum of intermediate node weights is the same and the number of intermediate nodes is the same, a path through which the RREQ signal has arrived first is selected. Then, the determined destination node generates a routing response signal and transmits the generated routing response signal to the source node 10 through the selected route path.

Meanwhile, the intermediate-node weight table is updated with the selected route path. The intermediate-node weight table is also updated with the number of routing response signals passing through intermediate nodes on the selected route path.

The source node 10 receives the routing response signal from the determined destination node and updates the address mapping table with a unicast address of the determined destination node that has transmitted the routing response signal. That is, the source node 10 records the unicast address of the destination node that has transmitted the routing response signal in the address mapping table.

Then, the source node 10 searches for the unicast address of the destination node by referring to the address mapping table and transmits a packet to the destination node corresponding to the unicast address.

If the address mapping table contains the unicast address corresponding to an anycast address, the source node 10 searches for a route path corresponding to the unicast address. Information about the route path corresponding to the unicast address is stored in a route path table. Table 4 below shows an example of a route path table.

TABLE 4

| Field | Type | Null | Key | Default |
|---|---|---|---|---|
| Unicast Addr | char 16 | | PRI | |
| Route Path | text | YES | | |
| TTL | Int 10 | | | |

For example, the source node 10 searches for the route path corresponding to the unicast address by referring to the route path table shown in Table 4. If the route path table contains the route path corresponding to the unicast address, the source node 10 tunnels a packet to the destination node corresponding to the unicast address through the route path.

Figure 3:
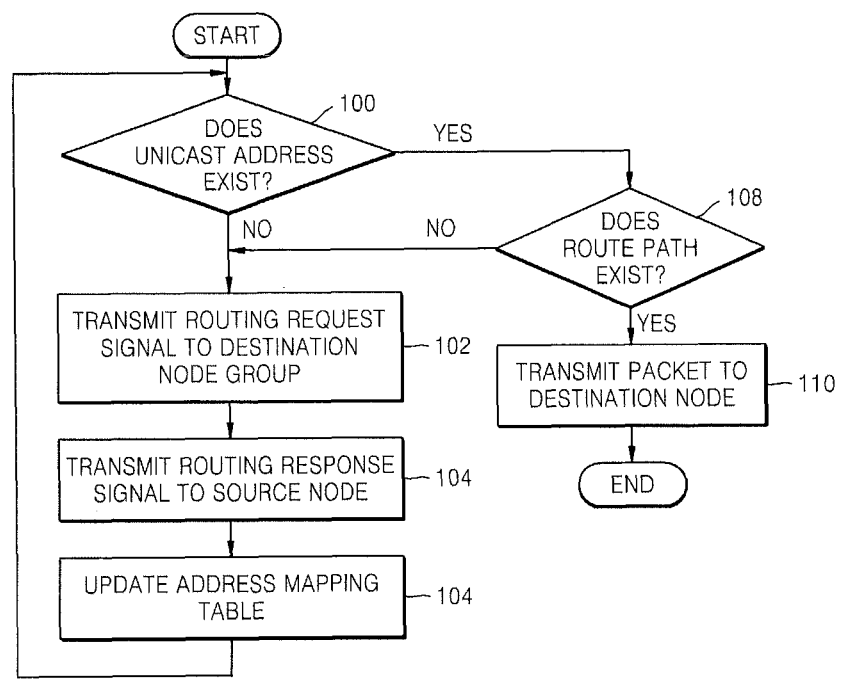
FIG. 3 is a flowchart illustrating a method of routing in a wireless network according to an embodiment of the present invention.

FIG. 3 is a flowchart illustrating a method of routing in a wireless network according to an embodiment of the present invention.

Referring to FIG. 3, first, a unicast address corresponding to an anycast address is searched for by referring to an address mapping table containing an anycast address and a unicast address (Operation 100.) For example, a unicast address is searched for by referring to the address mapping table shown in Table 1.

If, in Operation 100, the unicast address corresponding to the anycast address does not exist, a source node transmits a RREQ signal to a group of nodes with reference to the address mapping table (Operation 102.) Specifically, if the address mapping table does not contain the unicast address corresponding to the anycast address, the source node transmits an RREQ signal to a group of nodes corresponding to the anycast address.

After Operation 102, each node belonging to the group of nodes determines whether its own node is a destination node by referring to a traffic distribution table showing traffic throughput of the group of nodes and to an intermediate-node weight table showing weights of intermediate nodes on all the paths between the group of nodes and a source node. The weights of intermediate nodes are referred to in order to select a route path. When the destination node is determined, the determined destination node transmits a routing response signal to the source node (Operation 104.)

Figure 4:
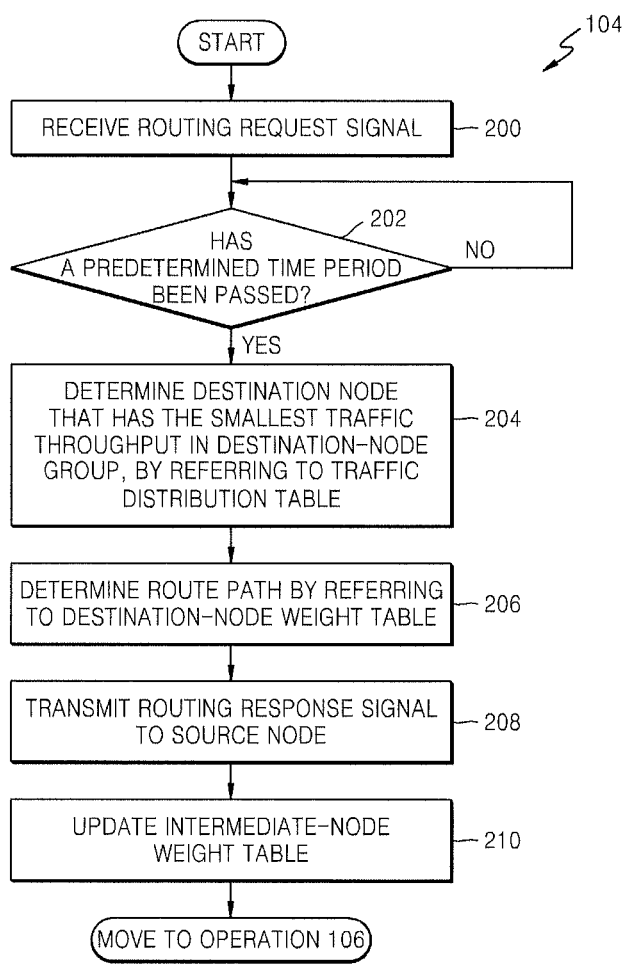
FIG. 4 is a flowchart illustrating an operation of transmitting a routing response signal to a source node performed in the method illustrated in FIG. 3.

FIG. 4 is a flowchart illustrating Operation 104 of FIG. 3 in more detail.

First, the routing request signal transmitted to the group of nodes is collected (Operation 200.) If a destination node selected from the group of nodes is located at an anycast address that is identical to a target address of the transmitted RREQ, the destination node collects the RREQ for a predetermined time period without immediate transmission of a routing response signal. Then, it is checked whether the predetermined time period has passed (Operation 202.) Herein, the predetermined time period may be not limited to any particular amount of time.

In Operation 202, if the predetermined time period has passed, a destination node that has the smallest traffic throughput in the group of nodes is determined by referring to a traffic distribution table (Operation 204.) The traffic distribution table shows current traffic throughputs of nodes. The network load on nodes can be evaluated by referring to the traffic distribution table. Table 2 shows an example of the traffic distribution table.

The other nodes excluding the determined destination node in the group of nodes delete RREQ signals they have received.

After Operation 204, the route path is selected by referring to an intermediate-node weight table (Operation 206.) The intermediate-node weight table contains a numerical value of the number of routing response signals passing through intermediate nodes on the selected route path and a numerical value of IP addresses of the intermediate nodes. The smaller the numerical value, the smaller the network load on an intermediate node is. The destination node that has the smallest traffic throughput determines a route path that has the smallest sum of intermediate node weights by referring to the intermediate-node weight table. If the sum of intermediate node weights is the same, a path in which the number of intermediate nodes is smallest is selected. If the sum of intermediate node weights is the same and the number of intermediate nodes is the same, a path through which the RREQ signal has arrived first is selected. Then, the determined destination node generates a routing response signal and transmits the generated routing response signal to the source node through the selected route path.

After Operation 206, the routing response signal is transmitted from the determined destination node to the source node through the selected route path (Operation 208.) The determined destination node generates the routing response signal and transmits the generated routing response signal to the source node through the selected route path.

After Operation 208, the intermediate-node weight table is updated with the selected route path (Operation 210.) The intermediate-node weight table is also updated with the number of routing response signals passing through intermediate nodes on the selected route path.

After Operation 104, the address mapping table is updated with a unicast address of the determined destination node that has transmitted the routing response signal (Operation 106.) That is, the source node records a unicast address of the destination node that has transmitted the routing response signal in the address mapping table.

Meanwhile, in Operation 100, if a unicast address corresponding to an anycast address exists, a route path corresponding to the unicast address is searched for (Operation 108.) Information about the route path corresponding to the unicast address is contained in a route path table. Table 4 described above is an example of the route path table.

In Operation 108, if the route path corresponding to the unicast address exists, a packet is transmitted to the destination node corresponding to the unicast address through the route path (Operation 110.) Specifically, the source node tunnels a packet to the destination node corresponding to the unicast address through the route path.

According to the present invention, in extreme environments, wireless traffic can be distributed at intermediate nodes as well as destination nodes. Therefore, all networks can be effectively used in extreme circumstances.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of routing in a wireless network, which is performed by each of a group of nodes, the method comprising:

receiving a routing request signal;

determining whether a node itself is a destination node, by referring to a traffic distribution table showing traffic throughput of the group of nodes and an intermediate-node weight table showing weights of intermediate nodes on all paths between the group of nodes and a source node, wherein a route path is selected by referring to the weights of intermediate nodes; and when it is determined that the node itself is the destination node transmitting a routing response signal to the source node that has transmitted the routing request signal, and receiving a packet from the source node, wherein the transmitting and receiving are performed by the determined destination node, wherein the transmitting of the routing response signal to the source node comprises:

collecting the routing request signal for a predetermined time period;

when the predetermined time period has passed, determining whether the destination node is a node having the smallest traffic throughput in the group of nodes, by referring to the traffic distribution table;

when the node determines itself as the destination node, selecting the route path by referring to the intermediate-node weight table, wherein the selecting is performed by the destination node; and transmitting the routing response signal to the source node through the selected route path, wherein the transmitting is performed by the destination node.

2. The method of claim 1, wherein, if the unicast address corresponding to the anycast address exists, a destination node corresponding to the unicast address receives the routing request signal.

3. The method of claim 1, wherein when the destination node is not the node having the smallest traffic throughput, the transmitted routing request signal is deleted by the destination node.

4. The method of claim 1, wherein the transmitting of the routing response signal to the source node comprises updating the intermediate-node weight table with the selected route path.

5. The method of claim 1, wherein the intermediate-node weight table contains a numerical value of the number of routing response signals passing through intermediate nodes on the route path.

6. An apparatus for routing in a wireless network, the apparatus comprising each of a group of nodes, the apparatus comprising:
    an interface unit receiving a routing request signal and a packet from a source node and transmitting a routing response signal to the source node;
    a memory storing a traffic distribution table showing traffic throughput of the group of nodes and storing an intermediate-node weight table showing weights of intermediate nodes on all paths between the group of nodes and the source node, wherein a route path is selected by referring to the weights of intermediate nodes; and
    a routing control unit determining a node as a destination node that is to generate the routing response signal by referring to the traffic distribution table and the intermediate-node weight table, generating the routing response signal, and transmitting the generated routing response signal to the source node,
    wherein the routing control unit determines whether the destination node is a node having the smallest traffic throughput in the group of nodes, by referring to the traffic distribution table, and when the destination node is determined as the node having the smallest traffic throughput, a route path is determined by referring to the intermediate-node weight table, and the routing response signal is transmitted to the source node through the determined route path.

7. The apparatus of claim 6, wherein if the destination node is not the node having the smallest traffic throughput, the routing control unit deletes the transmitted routing request signal.

8. The apparatus of claim 6, wherein the routing control unit updates the intermediate-node weight table with the determined route path.

9. The apparatus of claim 6, wherein the intermediate-node weight table contains a numerical value of the number of routing response signals passing through intermediate nodes on the route path.

* * * * *